(12) United States Patent
Stakelberg (10) Patent No.: US 10,711,611 B2
(45) Date of Patent: Jul. 14, 2020

(54) FAN BLADE REPAIR FIXTURE AND METHOD OF REPAIR

(71) Applicant: United Technologies Corporation, Farmington, CT (US)

(72) Inventor: Jurij Stakelberg, Hamburg (GR)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 113 days.

(21) Appl. No.: 15/933,027

(22) Filed: Mar. 22, 2018

(65) Prior Publication Data

US 2019/0292911 A1 Sep. 26, 2019

(51) Int. Cl.
| | | |
|---|---|---|
| *B23P 6/04* | (2006.01) | |
| *F01D 5/00* | (2006.01) | |
| *B23Q 3/06* | (2006.01) | |
| *B25B 5/14* | (2006.01) | |
| *F01D 25/28* | (2006.01) | |
| *B29C 73/24* | (2006.01) | |

(52) U.S. Cl.
CPC .............. *F01D 5/005* (2013.01); *B23P 6/045* (2013.01); *B23Q 3/063* (2013.01); *B25B 5/14* (2013.01); *F01D 25/285* (2013.01); *B29C 73/24* (2013.01); *F05D 2220/32* (2013.01); *F05D 2220/36* (2013.01); *F05D 2230/80* (2013.01); *F05D 2240/24* (2013.01)

(58) Field of Classification Search
CPC ........ F01D 5/005; F01D 25/285; F01D 5/282; B25B 5/14; B23Q 3/063; B23P 6/045; B29C 73/24; F05D 2220/36; F05D 2240/24; F05D 2230/80; F05D 2220/32
See application file for complete search history.

(56) References Cited

U.S. PATENT DOCUMENTS

| | | | |
|---|---|---|---|
| 4,522,380 A * | 6/1985 | Peddle | B23Q 1/4857 269/71 |
| 6,792,655 B2 | 9/2004 | Wah | |
| 6,912,446 B2 | 6/2005 | Wang et al. | |
| 8,490,956 B2 | 7/2013 | Korn et al. | |
| 2014/0020231 A1* | 1/2014 | Raczuk | B25B 27/10 29/525.01 |
| 2014/0041181 A1 | 2/2014 | Ubukata et al. | |

FOREIGN PATENT DOCUMENTS

| | | |
|---|---|---|
| CN | 106736718 | 5/2017 |
| EP | 2002926 | 12/2008 |
| EP | 2145734 | 1/2010 |
| EP | 3170617 | 5/2017 |

OTHER PUBLICATIONS

European Patent Office, European Search Report dated Aug. 16, 2019 in Application No. 19163901.2.

* cited by examiner

*Primary Examiner* — Sarang Afzali
*Assistant Examiner* — Ruth G Hidalgo-Hernandez
(74) *Attorney, Agent, or Firm* — Snell & Wilmer L.L.P.

(57) ABSTRACT

A fixture for repairing a fan blade may comprise a base having a first side, a second side, a tip end, and a foot end, a first support coupled at the first side and perpendicular to the base, a second support coupled at the second side and perpendicular to the base, and a footboard, perpendicular to the base coupled orthogonally between the first support and the second support at the foot end of the base, wherein the footboard comprises a chuck adapted to receive the foot of a fan blade.

13 Claims, 12 Drawing Sheets

FAN BLADE REPAIR FIXTURE AND METHOD OF REPAIR

FIELD

The disclosure relates generally to fan blades in gas turbine engines and related fixtures.

BACKGROUND

Gas turbine engine fan blades may comprise laminated composite materials which may tend to degrade with use or may be damaged during operation. In response, a portion of the fan blade surface may delaminate, leading to repair or rework of the delaminated portion of the fan blade.

SUMMARY

In various embodiments the present disclosure provides a fixture for repairing a fan blade comprising a base having a first side, a second side, a tip end, and a foot end, a first support coupled at the first side and perpendicular to the base, a second support coupled at the second side and perpendicular to the base, and a footboard, perpendicular to the base coupled orthogonally between the first support and the second support at the foot end of the base, wherein the footboard comprises a chuck adapted to receive the foot of a fan blade.

In various embodiments, the chuck comprises a keyway having an inner surface lined with one of natural rubber, synthetic rubber, silicone, a Room Temperature Vulcanizing (RTV) silicone compound, or a foam. In various embodiments, the fixture comprises a crossbar coupled across the first support and the second support. In various embodiments, the first support comprises a first rail and the second support comprises a second rail. In various embodiments, the first rail comprises a first channel and the second rail comprises a second channel, a crossbar coupled to the first rail at a first end by a first fastener and to the second rail at a second end by a second fastener, wherein the first end comprises a third channel, wherein the first fastener is disposed through the first channel and the third channel and wherein the second fastener is disposed through the second channel. In various embodiments, in response to traversing one of the first fastener within the first channel or the second fastener within the second channel, the first fastener is traversed within the third channel. In various embodiments, the footboard further comprises a notch and the chuck comprises a first tab, a second tab, and a keyway. In various embodiments, the footboard comprises a clearance cutout, a fourth channel, and a fifth channel, wherein the fourth channel and the fifth channel are defined about a circumference of the clearance cutout. In various embodiments, the chuck is coupled to the footboard at the second tab by a third fastener and at the first tab by a fourth fastener, wherein the third fastener is disposed thorough the fourth channel and the fourth fastener is disposed through the fifth channel. In various embodiments, in response to rotating the chuck, the fourth fastener is traversed within the fifth channel and the third fastener is traversed within the fourth channel. In various embodiments, the fourth channel and the fifth channel define a chuck rotation angle θ between a centerline of the notch and a centerline of the keyway. In various embodiments, the angle θ is between 0° and about 70°. In various embodiments, the footboard is coupled between the first support and the second support at the foot end of the base by a hinge, wherein, in response to traversing one of the first fastener or the second fastener, the footboard may pivot about the hinge to an angle ρ relative to the foot end. In various embodiments, ρ is between 0° and about 40°. In various embodiments, a buttress is coupled to one of the first support or the second support and coupled to the base.

In various embodiments, the present disclosure provides a method of manufacturing a fixture for repairing a fan blade, the method comprising coupling a first support to a first side of a base and perpendicular to the base, coupling a second support to a second side of the base and perpendicular to the base, coupling a footboard comprising a chuck adapted to receive the foot of a fan blade orthogonally between the first support and the second support at a foot end of the base and perpendicular to the base. In various embodiments, the method further comprises disposing a first fastener at a first end of a crossbar through a first channel of a first rail of the first support and second fastener at a second end of the crossbar through a second channel of a second rail of the second support and coupling the crossbar at the first end to the first rail and at the second end to the second rail.

In various embodiments, the present disclosure provides a method of repairing a fan blade, the method comprising inserting a foot of a fan blade comprising a damaged portion into a fixture for repairing a fan blade through a notch of a footboard coupled to a chuck and into a keyway of the chuck, wherein the footboard is coupled at a foot end of a base and perpendicular to the base and orthogonally between a first support and a second support, the first support coupled to a first side of the base and perpendicular to the base, the second support coupled to a second side of the base and perpendicular to the base, and rotating the chuck to an angle such that a plane defined by a circumference of the damaged portion is substantially parallel to a plane of the base defined by a first side, a second side, the foot end, a the tip end of the base. The method may further comprise contacting a contact surface of a crossbar with the fan blade, tightening a first fastener and a second fastener to generate a first interference and a second interference holding the contact surface in contact with the fan blade, generating in response a third interference between the contact surface and the fan blade holding the plane of the damaged portion substantially parallel to the plane of the base. The method may further comprise one of lubricating an inner surface of the keyway or applying a repair fluid to the damaged portion.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
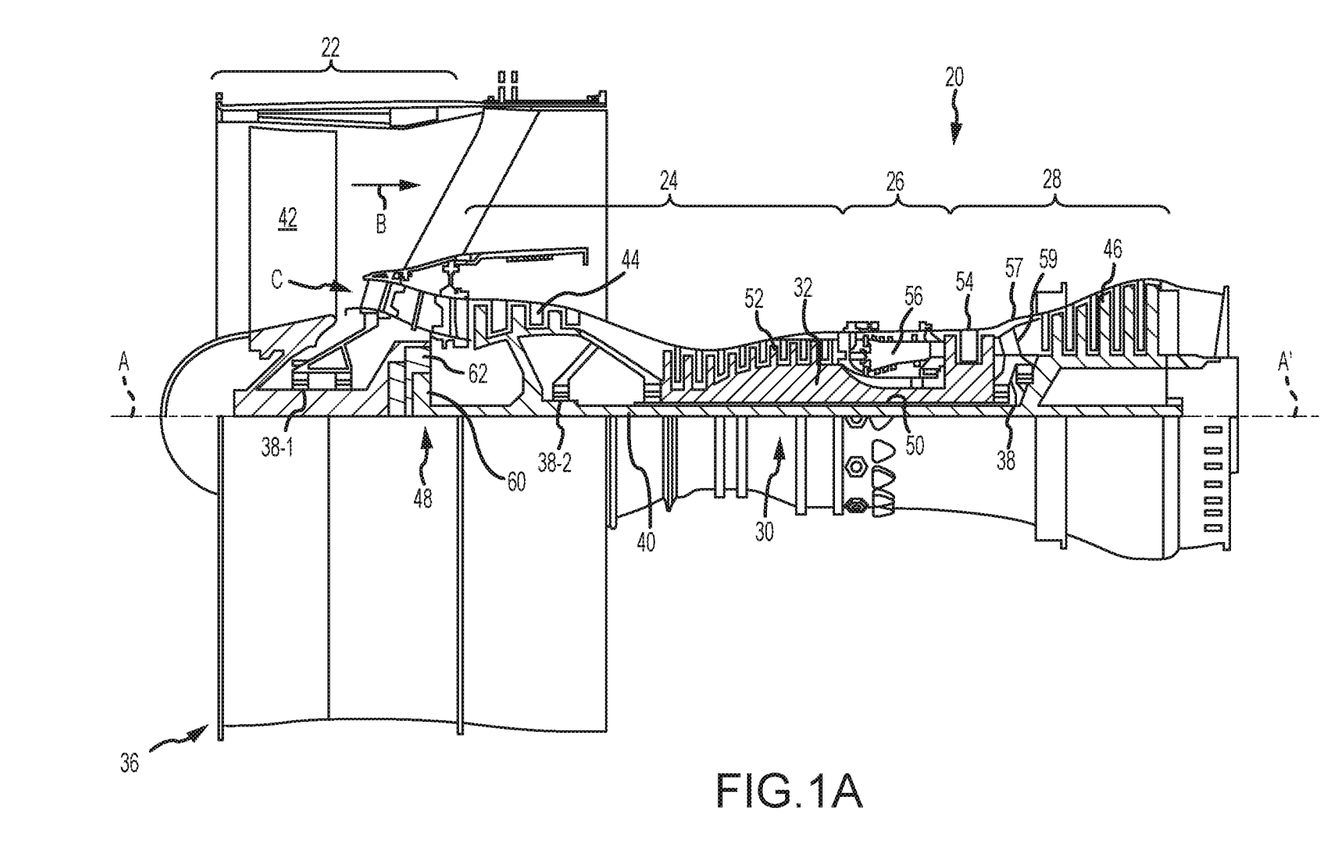
FIG. 1A illustrates an exemplary gas turbine engine, in accordance with various embodiments.

In various embodiments and with reference to FIG. 1A, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmenter section among other systems or features. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2 in FIG. 1A). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 1B:
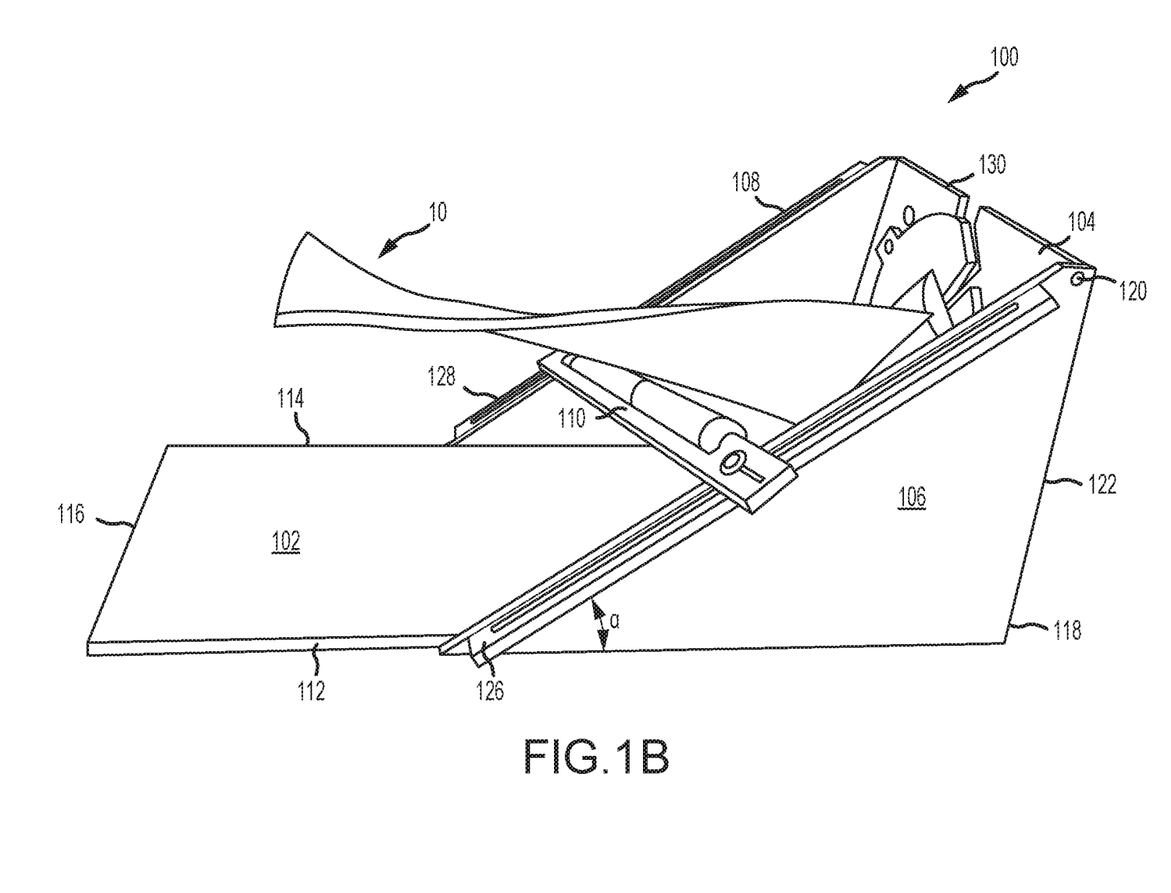
FIG. 1B illustrates a fan blade repair fixture, in accordance with various embodiments.

According to various embodiments and with reference to FIGS. 1A and 1B, fan 42 may tend to degrade with use or may be struck by foreign objects and tend to benefit from periodic repair or maintenance of fan blades comprising fan 42. In response, a fan blade 10 may be removed from fan 42 and placed in fixture 100 for repair. In various embodiments, fixture 100 comprises a base 102 and a footboard 104. A first support 106 is coupled at the first side 112 of the base 102 and a second support 108 is coupled at the second side 114 of the base 102. In various embodiments, the first support 106 and the second support 108 extend perpendicular to the plane of base 102 and, respectively, parallel to the first side 112 and the second side 114. In various embodiments, footboard 104 is coupled between the first support 106 and the second support 108 proximate the foot end 118 of base 102 by a hinge located at hinge point 120. In various embodiments, hinge point 120 is located proximate the foot edge 122 of the first support 106 and the foot edge 124 of the second support 108 and proximate the top edge 130 of footboard 104. In various embodiments, fan blade 10 may be coupled to footboard 104 and oriented to extend from footboard 104 toward tip end 116 of base 102.

Figure 2A:
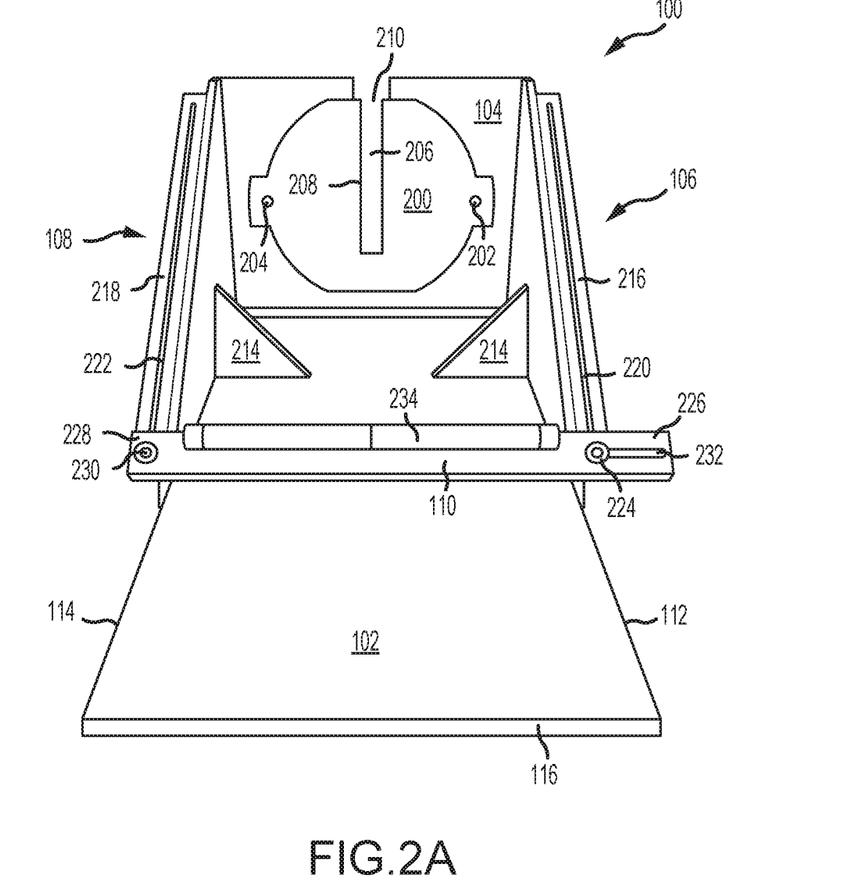
FIG. 2A illustrates a fan blade repair fixture viewed from a tip end toward a footboard, in accordance with various embodiments.
Figure 2B:
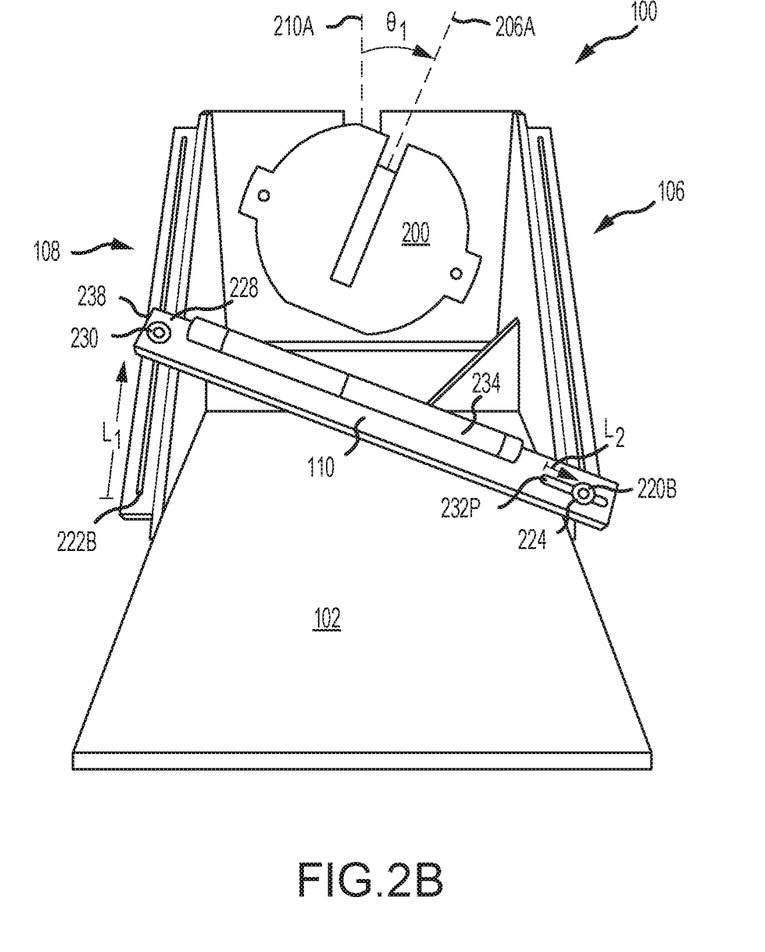
FIG. 2B illustrates a fan blade repair fixture viewed from a tip end toward a footboard, in accordance with various embodiments.
Figure 2C:
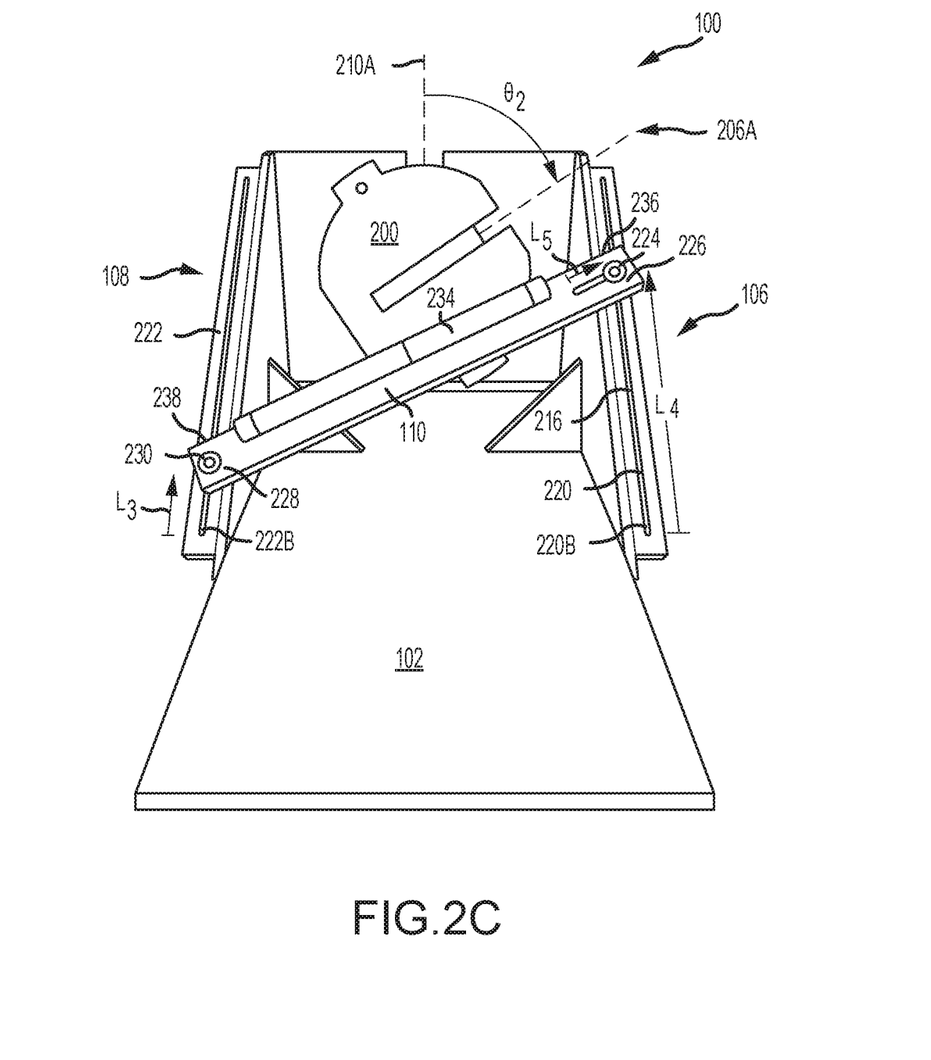
FIG. 2C illustrates a fan blade repair fixture viewed from a tip end toward a footboard, in accordance with various embodiments.

With reference to FIG. 2A-2C, in various embodiments, buttresses 214 may extend from an inner wall of first support 106 and an inner wall of second support 108. Buttresses 214 may be coupled to base 102 and may tend to increase the rigidity of a support. A first rail 216 may extend along a portion of the forward surface 126 of first support 106 and a second rail 218 may extend along a portion of the forward surface 128 of second support 108. First rail 216 and second rail 218 may extend from base 102 toward footboard 104 at an angle α between the plane of base 102 and each of the first rail 216 and the second rail 218. In various embodiments, first rail 216 comprises a first channel 220 and second rail 218 comprises a second channel 222. In various embodiments, first channel 220 and second channel 222 each extend over a portion of their respective rail (216, 218) and may extend fully through the thickness of the rail. In various embodiments, footboard 104 comprises a chuck 200 having a first tab 202 and a second tab 204. In various embodiments, footboard 104 further comprises a notch 210 in the top edge 130 which is aligned with a keyway 206 of chuck 200. In various embodiments, keyway 206 may be configured to receive a foot of a fan blade such as fan blade 10 and the inner surface 208 of keyway 206 may be lined with a protective or a grip enhancing material such as, for example, natural rubber, synthetic rubber, silicone, a Room Temperature Vulcanizing (RTV) silicone compound, or a foam.

In various embodiments, crossbar 110 may be coupled across first support 106 and second support 108 and may comprise a first end 226, a second end 228, a contact surface 234, and a third channel 232. In various embodiments, crossbar 110 is coupled at a first end 226 to first rail 216 by a first fastener 224 and coupled at a second end 228 to the second rail 218 by a second fastener 230. First fastener 224 extends through first channel 220 and third channel 232 and is configured to slide along first channel 220 and third channel 232. Second fastener 230 extends through second channel 222. In various embodiments, a first fastener may have a resting point at a bottom of a first channel and at proximate end of a third channel while a second fastener may have a resting point at a bottom of a second channel. In various embodiments, a fastener may comprise a hand operated fastener such as, for example, a butterfly nut or a thumb screw. In various embodiments and in response to tightening a fastener, an interference is created between a corresponding end of a crossbar and a rail which may hold a fastener relatively away from a resting point in a channel.

With reference to FIG. 2B and in various embodiments, chuck 200 may rotate in a plane parallel to footboard 104 and a rotation of chuck 200 may define an angle θ1 between a centerline 210A of notch 210 and a centerline 206A of keyway 206. While first fastener 224 rests at bottom 220B of first channel 220, second fastener 230 has traversed within second channel 222 a distance L1 from the bottom 222B of second channel 222 and, in response, first fastener 224 has traversed within third channel 232 a distance L2 from a proximate end 232P of third channel 232. In response to tightening second fastener 230, an interference 238 tends to bind second end 228 to second rail 218 and tends to hold second end 228 relatively away from the bottom 222B of second channel 222.

With reference to FIG. 2C and in various embodiments, chuck 200 is rotated to a second angle θ2 between centerline 210A and centerline 206A. First fastener 224 has traversed a distance L4 from bottom 220B of first channel 220 and, in response, has traversed a distance L5 from the proximate end 232P of third channel 232 to rest at a distal end of third channel 232. Second fastener 230 has traversed a distance L3 from the bottom 222B of second channel 222 in response to traversing the first fastener 224. In response to tightening first fastener 224, an interference 236 is created tending to bind first end 226 to first rail 216 and tending to hold first end 226 relatively away from the bottom 220B of first channel 220 and, in response to tightening second fastener 230, an interference 238 is created tending to bind second end 228 to second rail 218 and tending to hold second end 228 relatively away from the bottom 222B of second channel 222. In this regard, crossbar 110 may be disposed at an angle relative to the plane of base 102 defined by traversing first fastener 224 within first channel 220 and within third channel 232 and by traversing second fastener 230 within second channel 222 and may be fixed at an angle relative to the plane of base 102 in response to creating an interference.

Figure 2D:
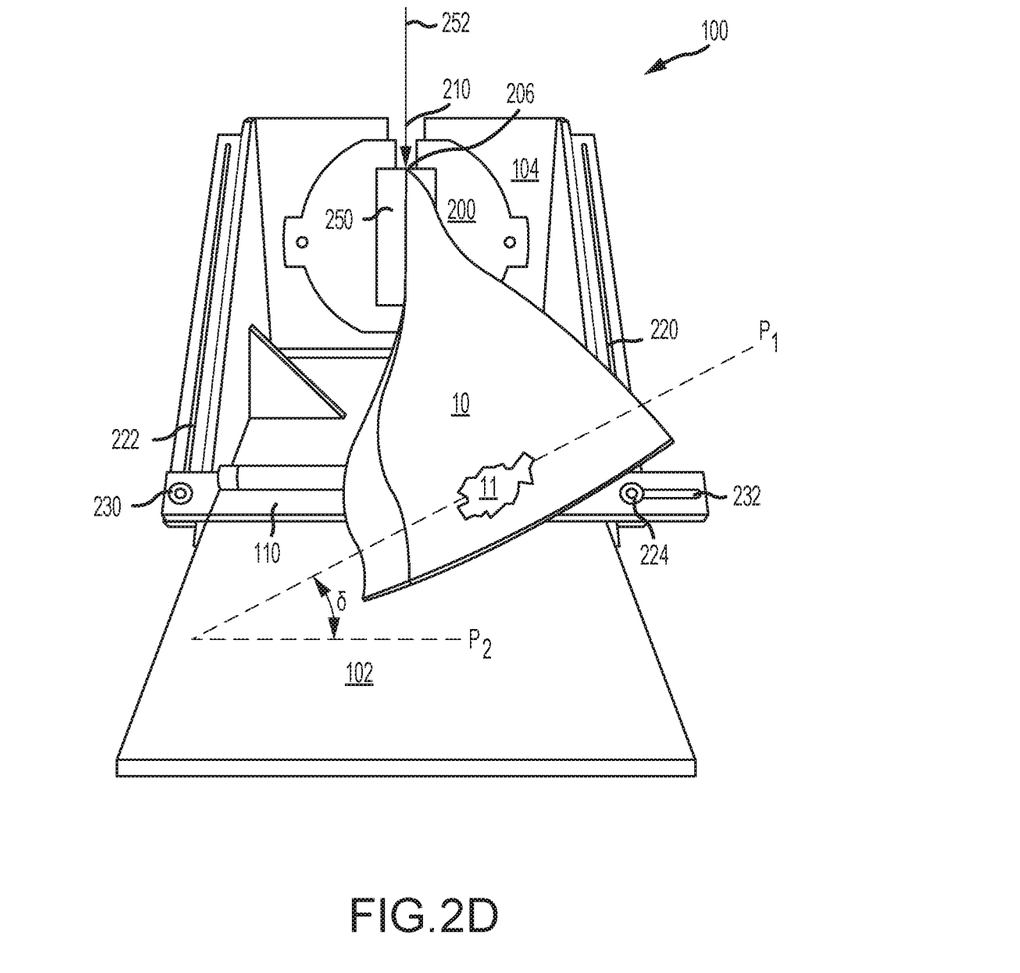
FIG. 2D illustrates a fan blade mounted in a fan blade repair fixture, in accordance with various embodiments.

With reference to FIG. 2D and in various embodiments, fan blade 10 comprising a damaged portion 11 is shown mounted in fixture 100. Fan blade 10 comprises a complex curved geometry such that a plane P1 defined by a circumference of damaged portion 11 may be disposed at an angle δ to a plane P2 of base 102 (the plane P2 defined by the first side 112, the second side 114, the foot end 118, a tip end 116 of the base 102) when foot 250 of fan blade 10 is disposed perpendicular to the plane P2 of base 102. In various embodiments, foot 250 of fan blade 10 is inserted along the path of arrow 252 through notch 210 of footboard 104 and into keyway 206 of chuck 200. Crossbar 110 is shown resting proximate base 102 with first fastener 224 in contact with bottom 220B of first channel 220 and in contact with proximate end 232P of third channel 232 and with second fastener 230 in contact with bottom 222B of second channel 222. In various embodiments, a repair fluid may be applied to damaged portion 11 tending to repair damaged portion 11. In various embodiments, an effectiveness of a repair of a damaged portion tends to be affected by a contact duration of the repair fluid and the damaged portion. Where a damaged portion, such as damaged portion 11, is disposed at an angle such as angle δ a repair fluid may tend to run off of a damaged portion tending thereby to decrease the contact duration between the repair fluid and the damaged portion and, in this regard, reducing an effectiveness of the repair.

Figure 2E:
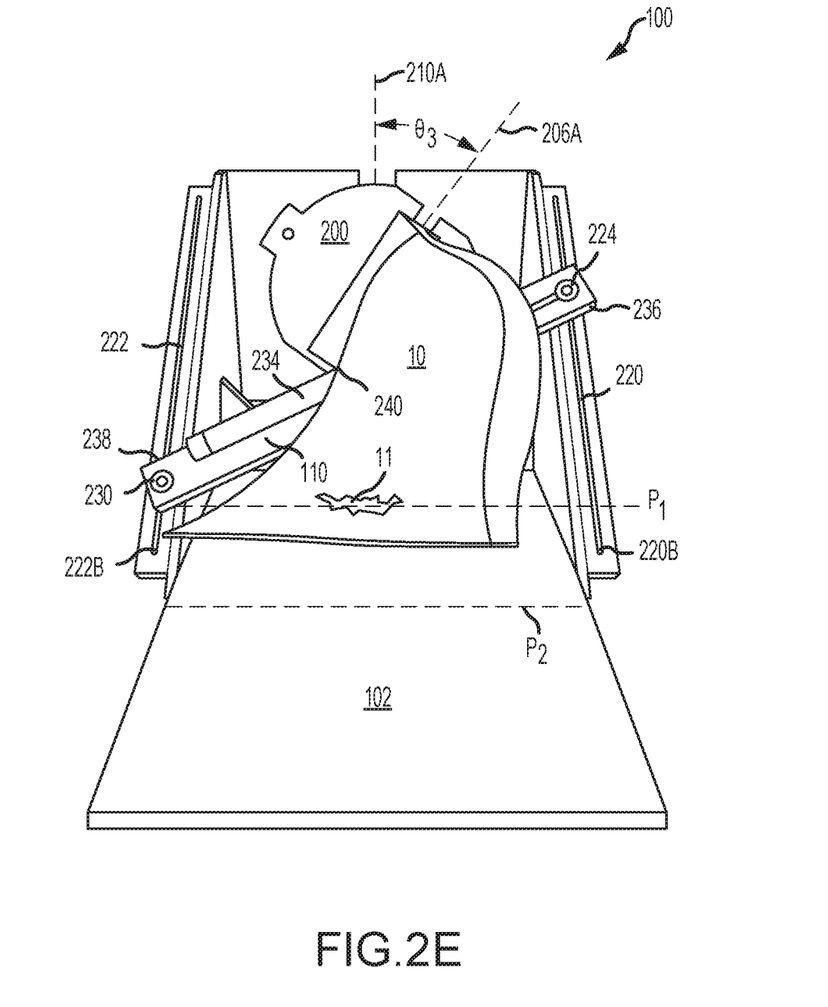
FIG. 2E illustrates a fan blade mounted in a fan blade repair fixture, in accordance with various embodiments.

In various embodiments and with reference to FIG. 2E, chuck 200 is rotated to an angle θ3 between centerline 210A and centerline 206A such that the plane P1 of damaged portion 11 is substantially parallel to the plane P2 of base 102, the term "substantially" in this context only means±5°. First fastener 224 and second fastener 230 are traversed a distance within each of their channels, respectively, from bottom 220B of first channel 220 and bottom 222B of second channel 222 and, in response, first fastener 224 has traversed a distance from proximate end 232P of third channel 232. In response to traversing the first fastener 224 and the second fastener 230 contact surface 234 of crossbar 110 is contacted with fan blade 10. In response to contact surface 234 of crossbar 110 contacting fan blade 10, first fastener 224 and the second fastener 230 are tightened creating an interference 236 and an interference 238 (a first interference and a second interference) tending to hold contact surface 234 of crossbar 110 in contact with fan blade 10. In various embodiments, an interference 240 (a third interference) between contact surface 234 and blade 10 tends to hold plane P1 of damaged portion 11 substantially parallel with plane P2 of base 102. In this regard, fixture 100 may tend to increase an effectiveness of a repair of a damaged portion by tending to inhibit a repair fluid from running off of a damaged portion thereby tending to increase the contact duration of the repair fluid and the damaged portion.

Figure 3A:
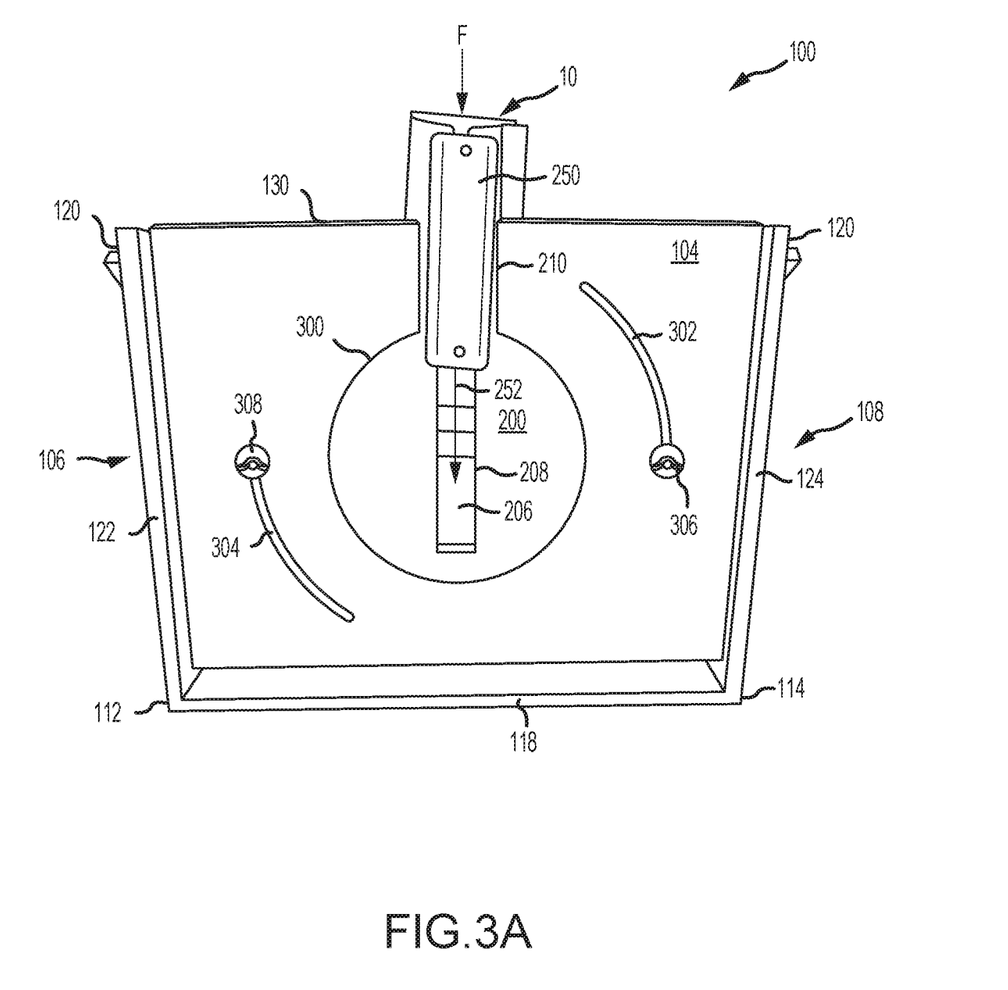
FIG. 3A illustrates a footboard of a fan blade repair fixture, in accordance with various embodiments.

In various embodiments and with additional reference to FIG. 3A, fixture 100 is viewed from footboard 104 toward tip end 116. Foot 250 of fan blade 10 is inserted along the path of arrow 252 through notch 210 of footboard 104 and into keyway 206 of chuck 200. In various embodiments, inner surface 208 of keyway 206 may be lubricated to reduce an interference between inner surface 208 and foot 250 tending thereby to reduce an insertion force F which tends to drive foot 250 into keyway 206. In various embodiments, footboard 104 comprises a clearance cutout 300 having a diameter defined by an axial dimension of foot 250. In various embodiments, chuck 200 is coupled to footboard 104 by a third fastener 306 disposed through a fourth channel 302 and a fourth fastener 308 disposed through a fifth channel 304. In various embodiments, fourth channel 302 and fifth channel 304 are defined by the circumference of clearance cutout 300. In various embodiments, third fastener 306 may be coupled to chuck 200 at second tab 204 and fourth fastener 308 may be coupled to chuck 200 at first tab 202. In various embodiments, a fastener may comprise a hand operated fastener such as, for example, a butterfly nut or a thumb screw. In various embodiments and in response to tightening a fastener, an interference may be created between a corresponding tab of a chuck and a footboard which may tend to bind the chuck to the footboard.

Figure 3B:
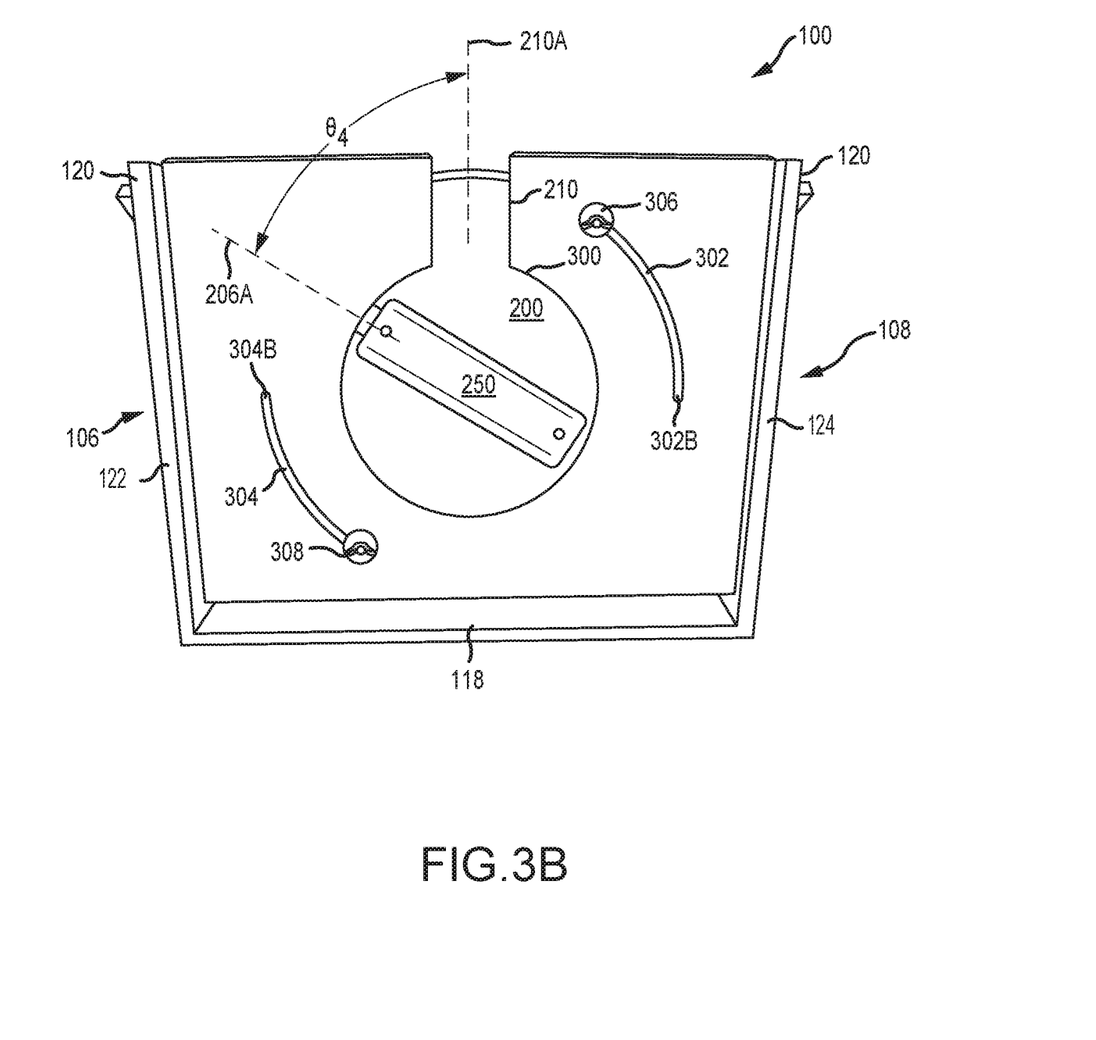
FIG. 3B illustrates a footboard of a fan blade repair fixture, in accordance with various embodiments.

In various embodiments and with reference to FIG. 3B chuck 200 is rotated to an angle θ4 between centerline 210A and centerline 206A and, in response to the rotation of chuck 200 third fastener 306 has traversed a distance within fourth channel 302 from base end 302B of fourth channel 302 to a distal end of fourth channel 302 and fourth fastener 308 has traversed a distance with fifth channel 304 from base end 304B of fifth channel 304 to a distal end of fifth channel 304 and, in this regard, the limit of travel of third fastener 306 and fourth fastener 308 within their respective channel tend to define the rotation of chuck 200. Stated another way, chuck rotation angle θ may tend to be defined by the geometry of fourth channel 302 and fifth channel 304. In various embodiments, the angle θ may be between 0° and about 70° where the term "about" in this context only means±10°. In various embodiments, inserting foot 250 into keyway 206 and rotating centerline 206A with respect to centerline 210A tends to cause chuck 200 to obstruct notch 210 tending thereby to lock foot 250 of blade 10 within keyway 206. ρ

Figure 3C:
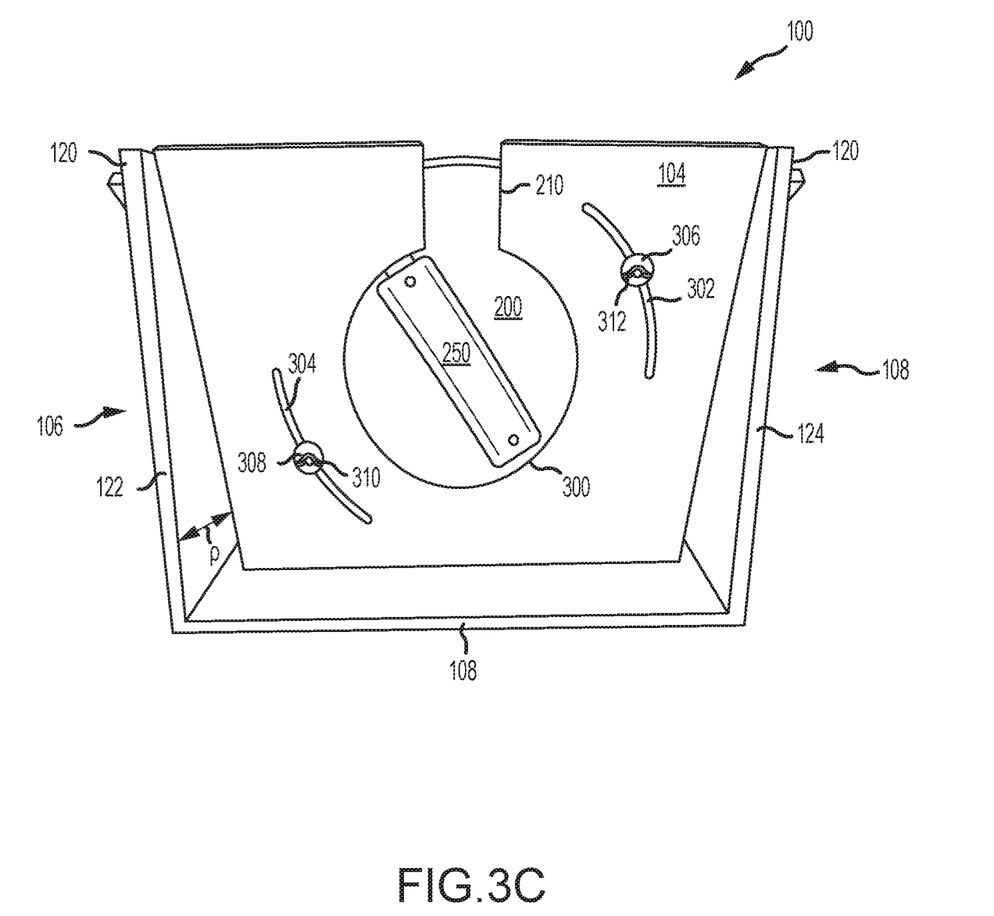
FIG. 3C illustrates a footboard of a fan blade repair fixture, in accordance with various embodiments.

In various embodiments and with reference to FIG. 3C, chuck 200 is rotated to angle θ1 and, in response, third fastener 306 has traversed a distance within fourth channel 302 from base end 302B of fourth channel 302 and fourth fastener 308 has traversed a distance with fifth channel 304 from base end 304B of fifth channel 304. Third fastener 306 and fourth fastener 308 are tightened to generate, respectively, interference 312 and interference 310. In various embodiments, interference 310 is generated between first tab 202 and footboard 104 and tends to bind chuck 200 to footboard 104. In various embodiments, interference 312 is generated between second tab 204 and footboard 104 and tends to bind chuck 200 to footboard 104. In this regard, interference 310 and interference 312 may tend to fix chuck 200 at the angle θ. In various embodiments, footboard 104 has pivoted about hinge point 120 from a resting position perpendicular to base 102 to an angle ρ relative to foot end 118. In various embodiments, footboard 104 may pivot about hinge point 120 in response to traversing the first fastener 224 and the second fastener 230. In various embodiments, interference 240 between contact surface 234 and blade 10 tends to hold footboard 104 at angle ρ. In various embodiments, angle ρ may be between 0° and about 40° where the term "about" in this context only means±10°.

Figure 4:
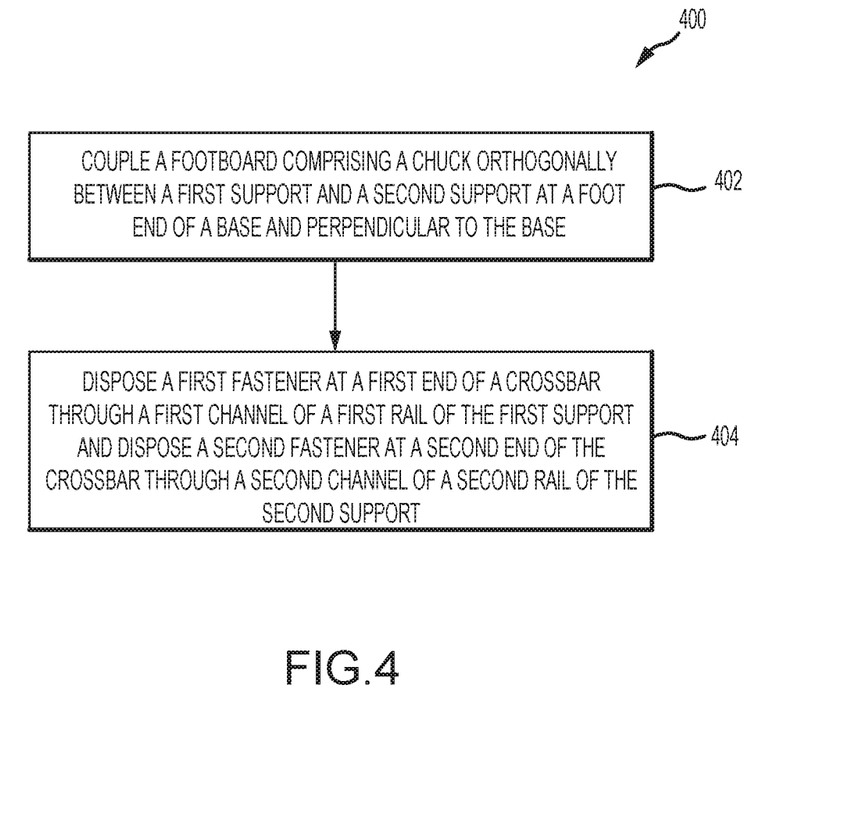
FIG. 4 illustrates a method of manufacturing a fan blade repair fixture, in accordance with various embodiments.

In various embodiments and with reference now to FIG. 4, a method 400 of fixture for repairing a fan blade may comprise coupling a first support to a first side of a base and perpendicular to the base, coupling a second support to a second side of the base and perpendicular to the base, coupling a footboard comprising a chuck orthogonally between the first support and the second support at a foot end of the base and perpendicular to the base (step 402). Method 400 further comprises disposing a first fastener at a first end of a crossbar through a first channel of a first rail of the first support and disposing a second fastener at a second end of the crossbar through a second channel of a second rail of the second support and coupling the crossbar at the first end to the first rail and at the second end to the second rail (step 404).

Figure 5:
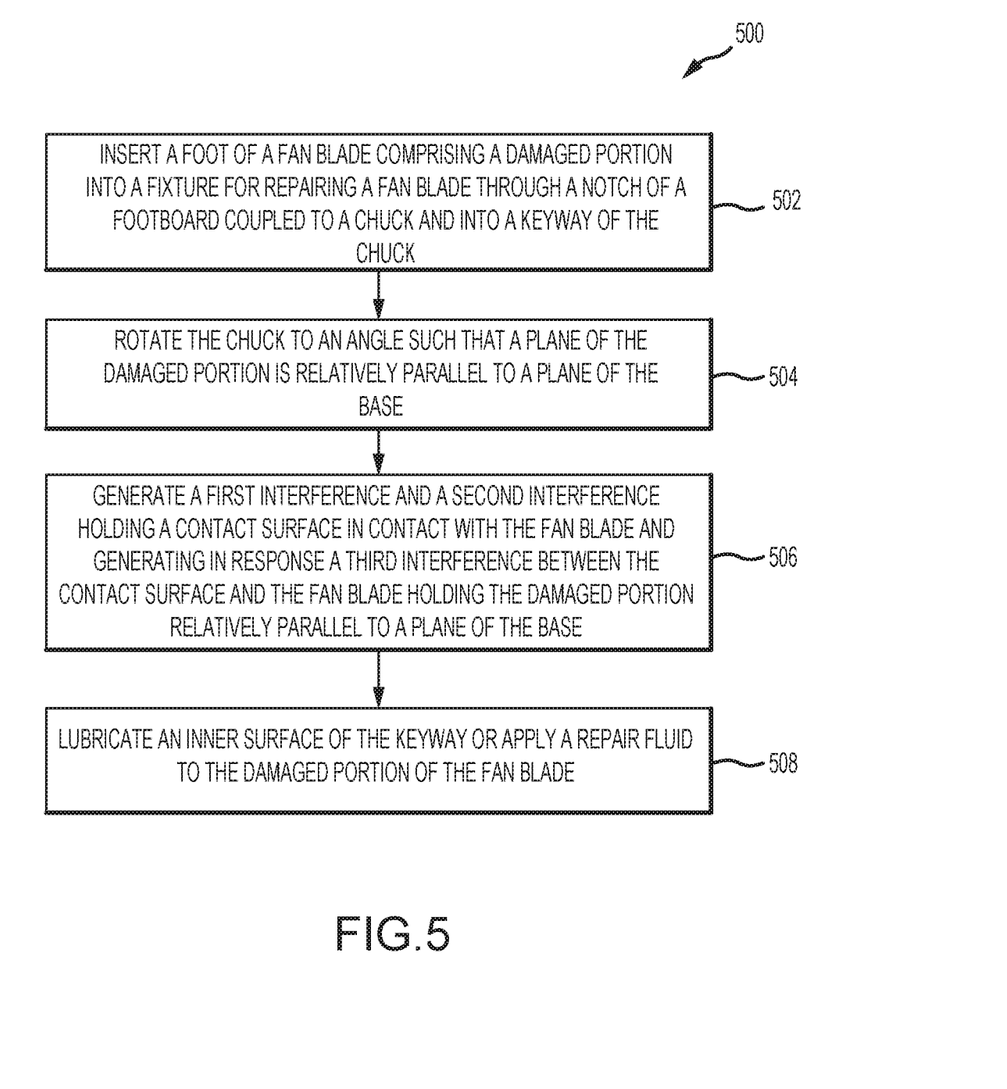
FIG. 5 illustrates a method of repairing a fan blade, in accordance with various embodiments.

In various embodiments and with reference now to FIG. 5, a method 500 of repairing a fan blade may comprise inserting a foot of a fan blade comprising a damaged portion into a fixture for repairing a fan blade through a notch of a footboard coupled to a chuck and into a keyway of the chuck (step 502), wherein the footboard is coupled at a foot end of a base and perpendicular to the base and orthogonally between a first support and a second support, the first support coupled to a first side of the base and perpendicular to the base, the second support coupled to a second side of the base and perpendicular to the base, and rotating the chuck to an angle such that a plane of the damaged portion is substantially parallel to a plane of the base (step 504). Method 500 may further comprise contacting a contact surface of a crossbar with the fan blade and, in response to the contacting the fan blade, tightening a first fastener and a second fastener to generate a first interference and a second interference holding the contact surface in contact with the fan blade, and generating in response a third interference between the contact surface and the fan blade holding the damaged portion substantially parallel to a plane of the base (step 506). Method 500 may further comprise lubricating an inner surface of the keyway or applying a repair fluid to the damaged portion of the fan blade (step 508).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fixture for repairing a fan blade, comprising:
    a base having a first side, a second side, a tip end, and a foot end;
    a first support coupled at the first side and perpendicular to the base;
    a second support coupled at the second side and perpendicular to the base; and
    a footboard, perpendicular to the base, coupled orthogonally between the first support and the second support at the foot end of the base, wherein the footboard comprises a chuck adapted to receive a foot of the fan blade;
    wherein the first support comprises a first rail and the second support comprises a second rail, and
    wherein the first rail comprises a first channel and the second rail comprises a second channel, a crossbar coupled to the first rail at a first end by a first fastener and to the second rail at a second end by a second fastener, wherein the first end comprises a third channel, wherein the first fastener is disposed through the first channel and the third channel and wherein the second fastener is disposed through the second channel.

2. The fixture of claim 1, wherein the footboard further comprises a notch and the chuck comprises a first tab, a second tab, and a keyway.

3. The fixture of claim 2, wherein the footboard comprises a clearance cutout, a fourth channel, and a fifth channel, wherein the fourth channel and the fifth channel are defined about a circumference of the clearance cutout.

4. The fixture of claim 3, wherein the chuck is coupled to the footboard at the second tab by a third fastener and at the first tab by a fourth fastener, wherein the third fastener is disposed through the fourth channel and the fourth fastener is disposed through the fifth channel.

5. The fixture of claim 4, wherein in response to rotating the chuck, the fourth fastener is traversed within the fifth channel and the third fastener is traversed within the fourth channel.

6. The fixture of claim 5, wherein the fourth channel and the fifth channel define a chuck rotation angle θ between a centerline of the notch and a centerline of the keyway.

7. The fixture of claim 6, wherein the chuck rotation angle θ is between 0° and about 70°.

8. The fixture of claim 1, wherein the footboard is coupled between the first support and the second support at the foot end of the base by a hinge, wherein, in response to traversing one of the first fastener or the second fastener, the footboard may pivot about the hinge to an angle ρ relative to the foot end.

9. The fixture of claim 8, wherein p is between 0° and about 40°.

10. The fixture of claim 1, wherein the chuck comprises a keyway having an inner surface lined with one of natural rubber, synthetic rubber, silicone, a Room Temperature Vulcanizing (RTV) silicone compound, or a foam.

11. The fixture of claim 1, further comprising a crossbar coupled across the first support and the second support.

12. The fixture of claim 1, wherein in response to traversing one of the first fastener within the first channel or the second fastener within the second channel, the first fastener is traversed within the third channel.

13. The fixture of claim 1, further comprising a buttress coupled to one of the first support or the second support and coupled to the base.

\* \* \* \* \*

UNITED STATES PATENT AND TRADEMARK OFFICE
CERTIFICATE OF CORRECTION

PATENT NO. : 10,711,611 B2  
APPLICATION NO. : 15/933027  
DATED : July 14, 2020  
INVENTOR(S) : Jurij Stakelberg Page 1 of 1

It is certified that error appears in the above-identified patent and that said Letters Patent is hereby corrected as shown below:

On the Title Page

In the Title, please delete "AND METHOD OF REPAIR"

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*